Nov. 1, 1949
V. G. MATHISON
2,487,024
MOTION-PICTURE PROJECTION ARC MONITOR
Filed Dec. 3, 1948
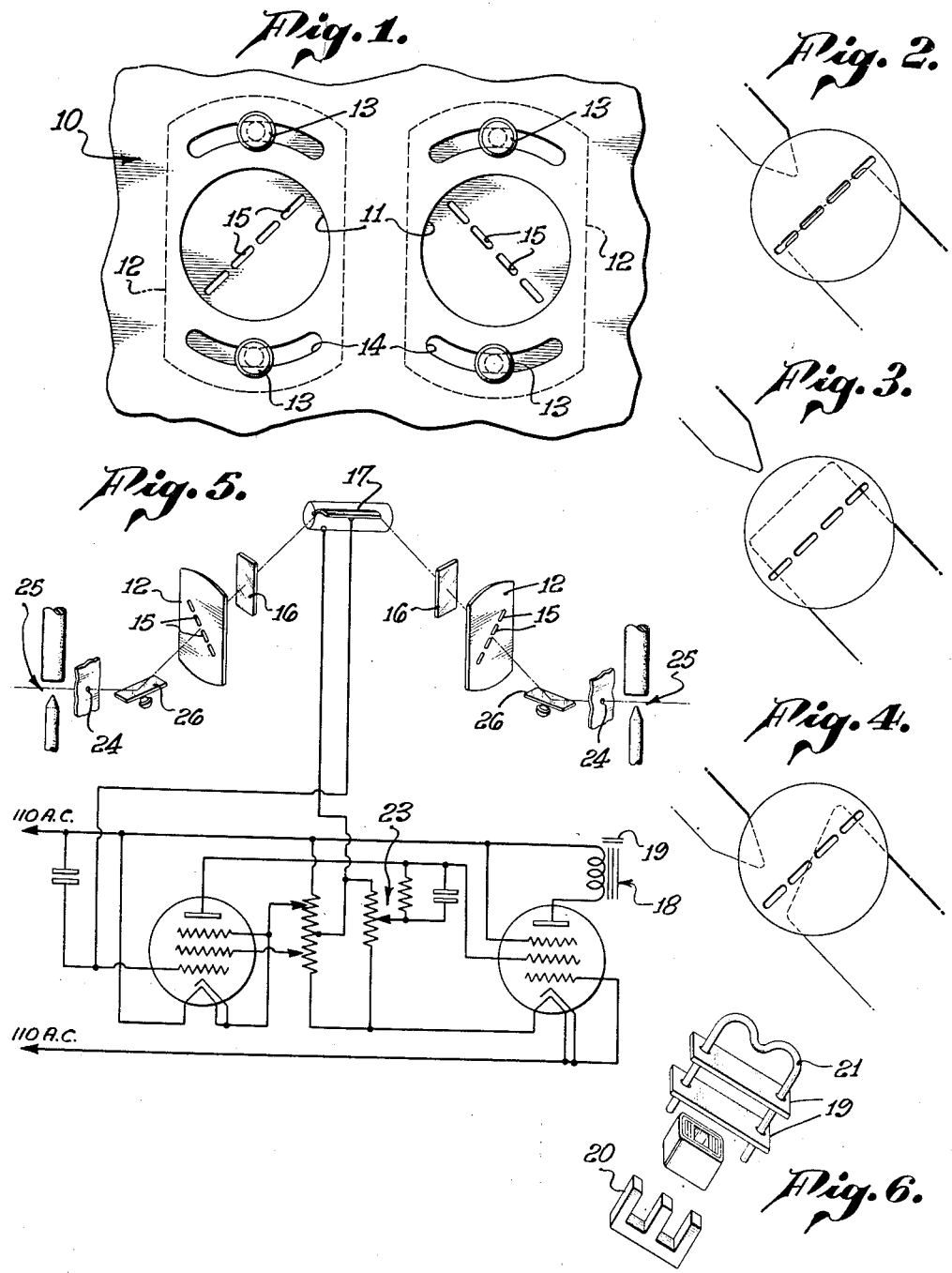
INVENTOR.

Patented Nov. 1, 1949

2,487,024

UNITED STATES PATENT OFFICE 2,487,024

MOTION-PICTURE PROJECTION ARC MONITOR

Volney G. Mathison, Los Angeles, Calif.

Application December 3, 1948, Serial No. 63,281

7 Claims. (Cl. 314—9)

My invention is an improved photo-electric device for monitoring a motion picture projection arc and warning the projectionist by an audible signal when the arc has deviated from an optimum mode of burning, with respect either to the positioning of its positive carbon or the inclination of the positive carbon tip.

The effective output of white light from a projection arc frequently diminishes as a result of improper feeding of the carbons; also when using carbon economizers these often warp, causing the tip of the positive carbon to burn away at an angle other than the optimum angle, which is substantially 90 degrees to the axis of the carbon. The close attention required by the arcs during an exhibition is harassing to the projectionist, particularly because a series of lamp trims may burn satisfactorily and then unexpectedly the light becomes "blue" or "brown" or is completely extinguished at a time when the operator is occupied at some task in the projection booth.

As is well known, the gas ball of a projection arc emits most of the white light useful for picture projection; other parts of the arc emit other colors, and in particular the tip of the positive carbon emits a great deal of red light. When a projection arc is viewed through a red light filter at an angle of something less than 100 degrees with respect to the axis of the positive carbon, most of the gas ball of the arc is screened from the eye by the enclosing wall of the crater of the positive carbon, the gas ball being somewhat compressed within the crater, and the tip of the positive carbon appears in sharp outline. This intense emission of red light from the tip of the positive carbon is utilized in my invention to obtain a selective action of a photo-tube in favor of said carbon tip, particularly provided that the arc is adjusted in a manner that produces optimum illumination of a projected motion picture.

The invention is fully disclosed by way of example in the following description and the accompanying drawing in which Fig. 1 is a sectional elevation of a shield having two apertures each covered by a movable perforated shutter.

Fig. 2 is a diagrammatic view of one of the shuttered apertures showing the image of an arc appearing on a shutter under a condition of optimum output of light from the arc and with the image of the positive carbon tip aligned with the perforations in the shutter.

Fig. 3 shows the image appearing on the shutter when the positive carbon is displaced in a lengthwise direction off its optimum position.

Fig. 4 shows the image resulting on the shutter when the positive carbon, although correctly positioned lengthwise, has its tip burned away at an incorrect angle as a result of a misalignment of the negative carbon.

Fig. 5 is a diagram showing in a non-proportional manner the schematic relationship of the optical elements of the invention and an associated electrical circuit.

Fig. 6 is an exploded view of a novel electromagnetic signalling device.

Reference to these views will now be made by use of like characters that are employed to designate corresponding parts throughout.

The numeral 10 designates a section of a shield. 11 designates two apertures in the shield, each aperture being screened by a rotatably movable shutter 12. 13 designates bolts and thumb-nuts whereby each shutter is clamped over the aperture it covers in any position within the rotational range afforded by semicircular slots 14 in the shield. Each shutter has a straight row of perforations 15 across its face. A color filter having a transmission characteristic favorable to light of a wavelength between 500 and 750 millimicrons, 16 (Fig. 5), is fastened against the back of each shutter, the filter having sufficient area to screen all openings in the shutter. A photo-tube 17 is mounted horizontally behind the shutters with respect to the axis of a line drawn through the diameters of the two apertures in the shield.

The photo-tube controls a vacuum-tube amplifier, the circuit diagram of which is shown in Fig. 5. The amplifier has 110 volt 60 cycle A. C. current applied to both its filament and plate circuits. In the plate circuit of the output tube is inserted the high-resistance winding of an electromagnet 18. When energized by a pulsating current this magnet actuates an armature 19 which consists of two superimposed unattached magnetizable leaves held loosely against the poles of the E-shaped core 20 of the magnet by a bowed rectangular wire retaining loop 21. When only a few milliamperes of pulsating current flow in the magnet coil the armature assembly vibrates in a complex manner and produces a strong, distinctive signal.

The grid bias of the amplifier output tube is adjusted by means of a potentiometer 23 to a critical value that prevents any significant flow of current in the output tube plate circuit and magnet coil as long as the photo-tube 17 is sufficiently illuminated. Upon a decrease in the amount of light reaching the photo-tube, the grid bias of the output tube swings in a positive direction, allowing a pulsating current to flow in the buzzer coil.

The vacuum-tube amplifying circuit shown in Fig. 5 forms no claimed part of my invention. It will be apparent to any one familiar with vacuum-tube amplifiers that other circuits can be used. Also, I do not wish to limit the invention to the use of the particular signalling device disclosed in Fig. 6. Other signalling devices can be employed.

The photo-tube, amplifier, and buzzer are housed in a compact molded plastic box, one of the enclosing walls of the box forming the shield 10 with its apertures and shutters. The monitor is mounted on the wall of the projection booth, at a distance from both of the two arc lamps always used alternately in commercial motion picture projection.

A pinhole 24 is made in the housing of each projection lamp in a place that affords a direct view of the arc 25 within an angular range of between 60 and 110 degrees with respect to the axis of the positive carbon, but preferably, if obtainable, at an angle of substantially 90 degrees Over the pinhole in each lamp housing a small mirror 26 is mounted on an adjustable support, whereby a simple unfocussed image of each arc is directed onto one of the shutters of the monitor.

Each arc is manually adjusted under a condition of actual projection until optimum registry of the motion picture on the screen is obtained. The particular shutter of the monitor upon which an image of the arc is being thrown is rotated and clamped so that the straight row of perforations in the shutter is substantially at a right angle to the longitudinal axis of the projected image of the positive carbon. The mirror on the lamp-house is adjusted so that the image of the tip of the positive carbon is substantially aligned upon the row of perforations in the shutter, the correct adjustment being represented in Fig. 2. A considerable amount of red light emitting from the tip of the positive carbon is thereby caused to impinge upon the cathode of the photo-tube behind the shutter. The potentiometer 23 is adjusted so that the monitor is silent. If the tip of the positive carbon now moves from its optimum positioning, its projected image will likewise move off the perforations in the monitor shutter, as indicated in Fig. 3, resulting in a decreased amount of light reaching the photo-tube and causing the signal buzzer to be operated. Although the actual displacement of the carbon tip may be slight, this deviation is magnified by the optical leverage obtained by placing the monitor at some distance from the mirrors on the lamp-houses.

Of equal importance, if the shape of the positive carbon tip alters due to a misalignment of the carbons, or from any other cause, the magnified image of the tip will become misaligned with the row of perforations in the shutter and will appear at some acute angle thereto, as indicated in Fig. 4, thereby also decreasing the amount of light reaching the photo-tube and causing the monitor buzzer to be operated.

The incorporation in the invention of two apertures each having an independently adjustable shutter makes it feasible to use a single monitor to watch two alternately operated projection arcs. Since the monitor can be adjusted to accept light beams from within a considerable range of incident angles with respect to the plane of its shutters, it does not have to be located precisely with respect to the arc lamps; it can be mounted on the wall in some convenient place among other items of equipment already installed in the projection booth.

The range of acceptance angles of light beams from the arcs may be increased by using a plurality of straight rows of perforations in each shutter instead of a single row. The monitor functions with almost any type of photo-tube that is fairly sensitive to red light frequencies. If a photo-tube peaked to red light frequencies is used, the red light filters 16 can be eliminated; the claimed combinations of elements comprising the invention remaining otherwise as described.

The shutters 12 can have single slots instead of a linear series of perforations. The slots should extend across the diameter of the apertures and be substantially greater in length than the actual diameter of the positive carbon of the arc that is to be monitored. The optical action and effect obtained by the use of a single slot of suitable length in the shutter of the monitor is substantially identical to the action and effect obtained by the use of a shutter having a linear series of perforations. The single slot is easily punched, whereas a linear series of perforations affords better protection to the color filter fastened onto back of the shutter. Three instead of two shuttered apertures can be incorporated in the shield 10 using the identical combinations of elements described; the invention can then be used to monitor an installation of three projection lamps.

I am aware that numerous combinations of a photo-tube and an aperture have been made in prior inventions; I do not claim such a combination broadly.

What I claim is:

1. A motion picture projection arc monitor comprising a shield, a plurality of apertures in said shield, a movable shutter screening each aperture, a linear series of perforations in each shutter, means for obtaining an auxiliary beam of light from each of a plurality of projection arcs, means for aligning the images of the tips of the positive arc carbons upon perforations in the shutters under a condition of positioning of the carbons and mode of burning of the arcs affording optimum illumination of a motion picture being projected with said arcs, means for positioning and retaining the shutters so that the lengthwise axis of the linear series of perforations in each shutter is substantially at a right angle with respect to the axis of the image of the positive carbon projected upon said shutter, a photo-tube behind the shutters placed where its cathode intercepts light beams from the arcs after passing through openings in the shutters, a vacuum-tube amplifier controlled by said photo-tube, means connected into the output circuit of said vacuum-tube amplifier for signalling the attendant operator when the image of the tip of the positive carbon of any arc deviates from a condition of alignment upon perforations in a shutter.

2. A motion picture projection arc monitor comprising a shield, a plurality of apertures in said shield, a movable shutter screening each aperture, a linear series of perforations in each shutter, means for obtaining an auxiliary beam of light from each of a plurality of projection arcs, means for aligning the images of the tips of the positive arc carbons upon perforations in the shutters under a condition of positioning of the carbons and mode of burning of the arcs affording optimum illumination of a motion picture being projected with said arcs, means for positioning and retaining the shutters so that the lengthwise axis of the linear series of perforations in each shutter is substantially at a right angle with respect to the axis of the image of the positive carbon projected upon said shutter, a photo-tube behind the shutters placed where its cathode intercepts light beams from the arcs after passing through openings in the shutters, a color filter having a transmission characteristic favorable to light of a wavelength between 500 and 750 millimicrons interposed in the light beams impinging upon the photo-tube, a vacuum-tube amplifier controlled by said photo-tube, means connected into the output circuit of said vacuum-tube amplifier for signalling the attendant operator when the image of the tip of the positive carbon of any arc deviates from a condition of alignment upon perforations in a shutter.

3. A motion picture projection arc monitor comprising a shield, a plurality of apertures in said shield, a movable shutter screening each aperture, a slot in each shutter substantially longer than the actual diameter of the positive carbon of the arc to be monitored, means for obtaining an auxiliary beam of light from each of a plurality of projection arcs, means for projecting the images of the arcs onto the shutters of the monitor, means for aligning the images of the tips of the positive arc carbons upon the slots in the shutters under a condition of positioning of the carbons and mode of burning of the arcs affording optimum illumination of a motion picture being projected with said arcs, means for positioning and retaining the shutters so that the lengthwise axis of the slot in each shutter is substantially at a right angle with respect to the axis of the image of the positive carbon projected upon said shutter, a photo-tube behind the shutters placed where its cathode intercepts light beams from the arcs after passing through openings in the shutters, a vacuum-tube amplifier controlled by said photo-tube, means connected into the output circuit of said vacuum-tube amplifier for signalling the attendant operator when the image of the tip of the positive carbon of any arc deviates from a condition of alignment upon a slot in a shutter.

4. A motion picture projection arc monitor comprising a shield, a plurality of apertures in said shield, a movable shutter screening each aperture, a slot in each shutter substantially longer than the actual diameter of the positive carbon of the arc to be monitored, means for obtaining an auxiliary beam of light from each of a plurality of projection arcs, means for projecting the images of the arcs onto the shutters of the monitor, means for aligning the images of the tips of the positive arc carbons upon the slots in the shutters under a condition of positioning of the carbons and mode of burning of the arcs affording optimum illumination of a motion picture being projected with said arcs, means for positioning and retaining the shutters so that the lengthwise axis of the slot in each shutter is substantially at a right angle with respect to the axis of the image of the positive carbon projected upon said shutter, a photo-tube behind the shutters placed where its cathode intercepts light beams from arcs after passing through openings in shutters, a color filter having a transmission characteristic favorable to light of a wavelength between 500 and 750 millimicrons interposed in the light beams impinging upon the photo-tube, a vacuum-tube amplifier controlled by said photo-tube, means connected into the output circuit of said vacuum-tube amplifier for signalling the attendant operator when the image of the tip of the positive carbon of any arc deviates from a condition of alignment upon a slot in a shutter.

5. A motion picture projection arc monitor comprising a shield, a plurality of apertures in said shield, a movable shutter screening each aperture, a linear series of perforations in each shutter, means for obtaining an auxiliary beam of light from each of a plurality of projection arcs, means for projecting the images of the arcs onto the shutters of the monitor, means for aligning the images of the tips of the positive arc carbons upon the perforations in the shutters under a condition of positioning of the carbons and mode of burning of the arcs affording optimum illumination of a motion picture being projected with said arcs, means for positioning and retaining the shutters so that the lengthwise axis of the linear series of perforations in each shutter is substantially at a right angle with respect to the axis of the image of the positive carbon projected upon said shutter, a photo-tube behind the shutters placed where its cathode intercepts light beams from arcs after passing through the shutters, a vacuum-tube amplifier controlled by said photo-tube, a signal buzzer operated by the vacuum-tube amplifier, said signal buzzer consisting of a plurality of unattached superimposed magnetic leaves retained loosely against a plurality of pole faces of an electromagnet which has its energizing coil winding connected into the output circuit of the vacuum-tube amplifier, all substantially as described.

6. A motion picture projection arc monitor comprising a shield, a plurality of apertures in said shield, a movable shutter screening each aperture, a slot in each shutter substantially longer than the actual diameter of the positive carbon of the arc to be monitored, means for obtaining an auxiliary beam of light from each of a plurality of projection arcs, means for projecting the images of the arcs onto the shutters of the monitor, means for aligning the images of the tips of the positive arc carbons upon the slots in the shutters under a condition of positioning of the carbons and mode of burning of the arcs affording optimum illumination of a motion picture being projected with said arcs, means for positioning and retaining the shutters so that the lengthwise axis of the slot in each shutter is substantially at a right angle with respect to the axis of the image of the positive carbon projected upon said shutter, a photo-tube behind the shutters placed where its cathode intercepts light beams from the arcs after passing through the openings in the shutters, a vacuum-tube amplifier controlled by said photo-tube, a signal buzzer operated by the vacuum-tube amplifier, said signal buzzer consisting of a plurality of unattached superimposed magnetic leaves retained loosely against a plurality of pole faces of an electromagnet which has its energizing coil winding connected into the output circuit of the vacuum-tube amplifier, all substantially as described.

7. A motion picture projection arc monitor comprising a shield, a plurality of apertures in said shield, a movable shutter screening each aperture, a slot in each shutter, means for obtaining an auxiliary beam of light from each of a plurality of projection arcs, means for projecting the images of the arcs onto the shutters of the monitor, means for aligning the images of the tips of the positive arc carbons upon the slots in the shutters under a condition of positioning of the carbons and mode of burning of the arcs affording optimum illumination of a motion picture being projected with said arcs, means for positioning and retaining the shutters so that the lengthwise axis of the slot in each shutter is substantially at a right angle with respect to the lengthwise axis of the image of the positive carbon projected upon said shutter, a photo-tube behind the shutters placed where its cathode intercepts light beams from the arcs after passing through the openings in the shutters, a vacuum-tube amplifier controlled by said photo-tube, means connected into the output circuit of said vacuum-tube amplifier for signalling the attendant operator when the image of the tip of the positive carbon of any arc deviates from a condition of alignment upon a slot in a shutter.

VOLNEY G. MATHISON.

REFERENCES CITED

The following references are of record in the file of this patent:

UNITED STATES PATENTS

| Number | Name | Date |
| --- | --- | --- |
| Re. 15,652 | Woltmann | July 10, 1923 |
| 2,160,490 | Strong | May 30, 1939 |
| 2,469,664 | Murch | May 10, 1949 |